Aug. 2, 1960   J. A. FLINT   2,947,501
JET DEFLECTORS FOR AIRCRAFT
Filed Oct. 12, 1953   3 Sheets-Sheet 2

Inventor
John Avery Flint
By
Attorneys

Aug. 2, 1960     J. A. FLINT     2,947,501
JET DEFLECTORS FOR AIRCRAFT
Filed Oct. 12, 1953     3 Sheets-Sheet 3
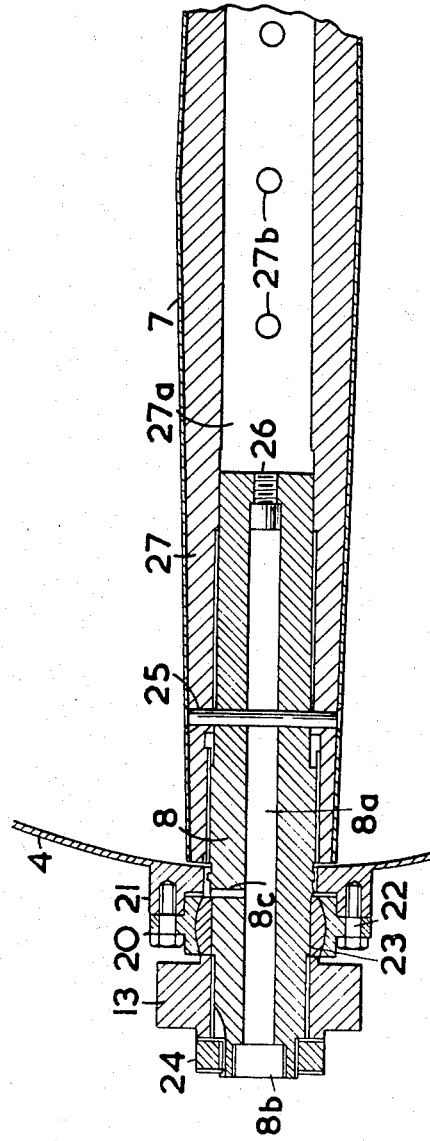
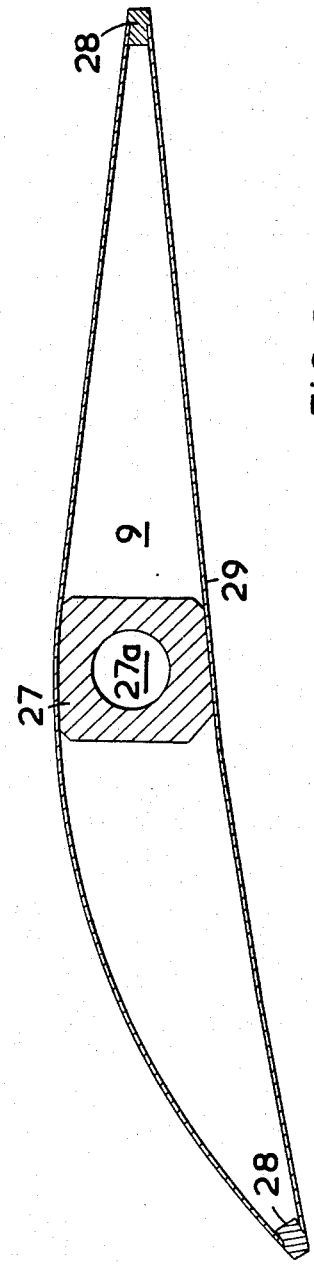

United States Patent Office 2,947,501
Patented Aug. 2, 1960

2,947,501
JET DEFLECTORS FOR AIRCRAFT

John Avery Flint, Cove, Farnborough, England, assignor to Power Jets (Research and Development) Limited, London, England, a British company Filed Oct. 12, 1953, Ser. No. 385,628

Claims priority, application Great Britain Oct. 21, 1952

4 Claims. (Cl. 244—51)

This invention relates to a deflecting device located in the jet nozzle unit of a jet propelled aircraft for diverting the jet from a rearwardly directed nozzle into a downwardly directed nozzle.

According to the invention a hinged jet deflector vane is a butterfly valve in a circular jetpipe—i.e. a disc pivoted about a diameter or axis, such as an elliptical disc pivoted about its major or minor axis. There will in general be two such discs—one for obstructing the entry to the rearwardly directed propulsion nozzle when the jet is directed downwardly and the other for obstructing the entry to the downwardly directed nozzle when the jet is directed rearwardly for forward flight. The latter disc preferably is curved to assist in guiding the deflected jet into the entry to the downwardly directed nozzle and furthermore this disc may carry some additional vanes.

Each disc is mounted on a hinge pin turning with the disc and extending through a sealing gland in the side wall of the nozzle unit to an external supporting bearing on one or preferably both sides, this pin serving as the operating shaft. According to a further feature of the invention, provision is made for supplying cooling air under pressure for cooling the external bearing of the hinge pin and to form a gas seal opposing leakage from the jet where the hinge pin passes through the wall; according to yet another feature the hinge pin may be hollow so that this air can pass through it to cool the hinge pin and the disc.

A form of the invention is shewn in the accompanying dawings of which:

Figure 4 is a view similar to Figure 2 but with the butterfly valves in position for deflecting the jet downwardly;

Figure 6 is an enlarged sectional detail of the gland and bearing;

Figure 8 is a section through a butterfly disc; and

Figure 9 is a perspective view of part of a disc to show the construction.

Figure 1:
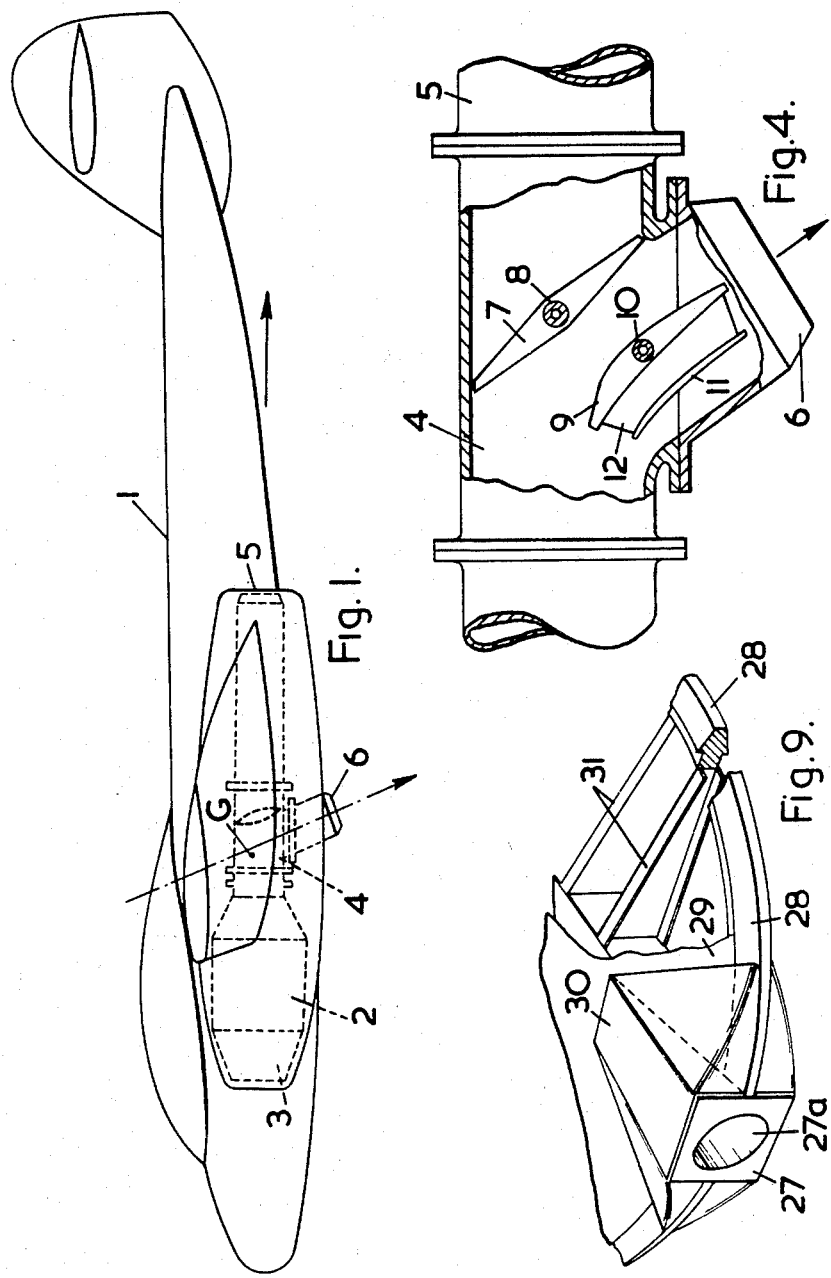
Figure 1 shows in outline the arrangement of the invention in an aircraft.

In Figure 1 the aircraft 1 carries in a conventional nacelle a jet engine 2 having an inlet 3. The jet exhaust pipe of the engine is fastened to the flanged forward end of a separately formed bifurcated tubular portion of the nozzle unit consisting of a T piece 4 with a main portion extending in line with the jet pipe to a flanged rear end fastened to the rear propulsion nozzle 5 and a straight downward branch to a flange fastened to the downward nozzle 6.

The main part of the T piece 4, in line with the jet pipe, and the downwardly directed branch are both internally cylindrical. Nozzles 5 and 6 are the usual contracting nozzles, the plane of the discharge orifice of each being perpendicular to the axis of the tubular part. In nozzle 6 this axis may be vertical—when the aircraft is in its position for normal horizontal flight—or point slightly rearwardly, as shown, at an angle to the vertical, but it should be a continuation of a line passing through or very near to a horizontal through the centre of gravity G of the aircraft. The plane of the discharge orifice of nozzle 5 is vertical.

Figure 2:
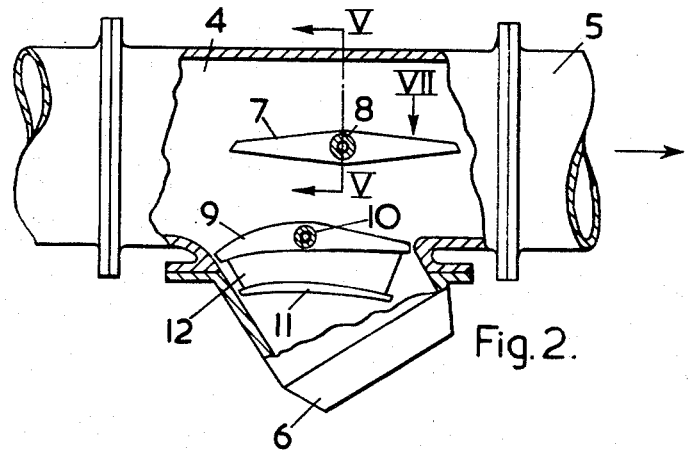
Figure 2 is a view of the deflector, partly in axial section along the nozzle unit.
Figure 7:
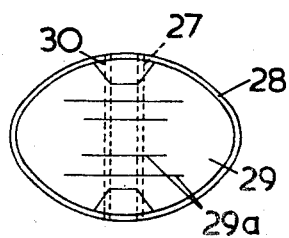
Figure 7 is a plan of one butterfly disc looking in direction of arrow VII in Figure 2.

Mounted within the T piece 4 as shown in Figure 2 are hinged deflector vanes in the form of butterfly valve discs 7 and 9. The disc 7 is pivoted about an axis along a diameter of the jet pipe and nozzle unit through a point which is substantially the point of intersection of the jet pipe axis and a line which is an upward continuation of the rearmost part of the wall of the downward branch of the T piece 4, or a point somewhat in advance of this intersection point. Due to the rearward inclination of the downward branch, this line makes an acute angle with the jet pipe axis. Butterfly valve disc 7 is an elliptic disc, as seen in Figure 7, the pivotal axis being the minor axis of the ellipse. During normal flight, disc 7 lies along the jet pipe axis, as shown in Figure 2; it tapers in thickness from the middle towards the periphery so as to be somewhat of a streamline form and cause the minimum of energy loss in the gas flowing over it to the rear nozzle 5.

Disc 9 is also elliptical and pivoted on its minor axis along the direction of a diameter of the downward branch, at or near to where this branch meets the main part of the T piece 4. During normal flight, butterfly valve disc 9 lies along this junction within the T piece; due to its elliptic shape it fits in and substantially blocks up the entrance to the downward branch, as shown in Figure 2.

For diverting the jet downwards, each of the butterfly valve discs 7 and 9 is turned about its pivotal axis to the position shown in Figure 4. In its new position, the disc 7 lies obliquely across the jet pipe axis; due to its elliptic shape it fits in and blocks up the entrance leading to the rearward nozzle 5. Moreover this valve disc now acts as a deflector for diverting the jet into the downward branch. The disc 9 now lies partly along the axis of the downward branch and partly obliquely across the main part of the T piece. Like the first butterfly valve disc 7 this second valve disc 9 is also tapered towards its periphery to present a streamlined surface to the deflected jet stream; furthermore it is preferably not flat but shaped to present a curved guiding surface to the jet stream.

There may be one or more webs 12 projecting down from disc 9 to secure a further and smaller guide disc 11 thereto. Guide disc 11 lies in the downward branch when valve 9 is closed. When however the jet is diverted downwardly, the disc 9 and its attached guide disc 12, which are substantially parallel and similarly curved, form curved corner vanes as shown in Figure 4 for guiding and sub-dividing the diverted jet stream in well-known manner, as the stream flows around the corner.

The major and minor axes of the two ellipses are so chosen that around each of the valve discs 7 and 9, when it is closed, and after thermal expansion at the working temperature of the jet pipe and nozzle unit, there is a determined small clearance between the thin rim of the disc and the inside wall of the T piece 4, to avoid jamming of the valve by hard mechanical contact with the wall while keeping leakage of gas past the valves to a minimum. As overturning of the first butterfly valve would cause such hard mechanical contact, some travel-limiting means are provided, preferably incorporated in the actuator 18 mentioned hereinafter.

Figure 3:
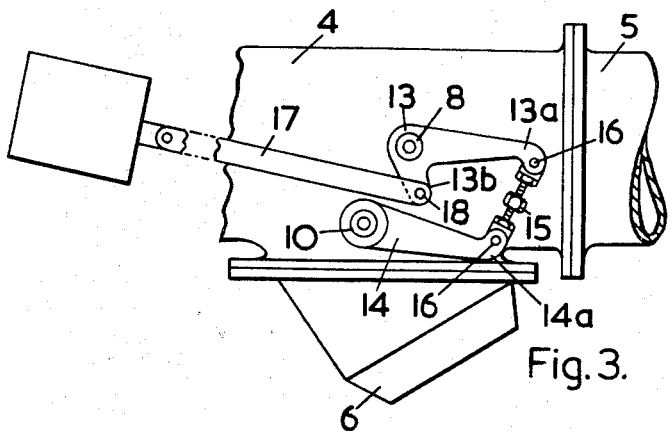
Figure 3 is an external view corresponding to Figure 2.
Figure 5:
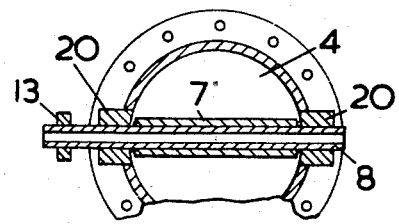
Figure 5 is a section looking on V—V of Figure 2.

A hinge pin 8 secured to and turning with the disc 7 is provided; as shown in Figure 5, each hinge pin extends through one of diametrically opposite glands in the walls of the T piece to external supporting bearings 20. A similar hinge pin 10 is secured to disc 9. For operating the butterfly valves, a bell-crank is secured to hinge pin 8 outside the jet pipe, as shown in Figure 3 and a lever 14 is secured to the hinge pin 10 outside the T piece. Bell-crank 13 and lever 14 have arms which are of two different lengths treminating in forks 13a and 14a with pivot pins 16 connected by a link 15, preferably of the kind screwed and adjustable in length, constraining the arms to move together through two different angles. A link 17 connects pivot pin 18 in fork 13b of bell-crank 13 to an actuator—preferably a hydraulic actuator. The hydraulic system is preferably of the well-known conventional kind so controled by the valve mechanism as to bring the butterfly valves 7 and 9 accurately to rest and apply a hydraulic lock holding them—at each end of travel—in a predetermined position, against any unbalanced forces due to gas pressure on them, and so maintain the correct small clearance around each disc when it is in the valve-closing position. Movement of link 17 to the left will move the valves from the positions of Figure 2 to those of Figure 4.

Figure 6 shows how hinge pin 8 is carried in a self-aligning bearing 20. This is attached to the gland 21 on T-piece 4 by screws 22 and contains, in a spherical seating, the journal bearing 23 bored to receive hinge pin 8. These spherical bearings at each end permit deflection under load. Secured by pin 25 to the hinge pin 8, to turn with it, is the hub 27 of the butterfly valve disc 7, which has a bore 27a to receive the pin 8. The bell-crank 13 is secured to the end of the pin 8 and held by a retaining nut 24 which, with pin 25, will determine a small end clearance between the hub and the wall. The other end of the hub is not pinned to its hinge pin and so allows relative thermal expansion of the valve disc, but so that after such expansion there is still an end clearance at this other end.

Each hinge pin 8 has a bore 8a and a counterbore 8b suitable for connection to a source of cool air under pressure. Radial holes 8c can let air from bore 8a into the spaces between the bearing and the hinge pin 8 and the gland 21, this air cooling the bearing and maintaining a pressure opposing leakage of gas from the jet through the gland 21. In a power plant consisting of a gas turbine and compressor type jet engine the cooling air may be tapped from the compressor of the power plant. A plug 26 closes up the end of the bore 8a. If however this plug be removed, the air supplied to bore 8a can pass through holes 27b in the hub 27 into the hollow interior of the butterfly valve disc 7 for cooling the disc and then escape into the jet through slits 29a shown in Figure 7. The pivot pins 10 are similarly constructed and supported in similar bearing arrangements.

The hub 27 is of approximately square or rectangular cross-section with a circular bore 27a. Referring again to Figure 7 the valve disc is made up of this hub 27, a thin tapered rim 28 (formed of two half elliptical parts each welded at each end to the hub), a sheet metal skin 29 extending over the hub down to the rim on each side of the disc, and gusset plates 30. There are also internal stiffening ribs, not visible in this view. Slits 29a provided in the skin on the top and bottom of the disc are primarily to reduce risk of distortion of the skin due to relative thermal expansions. They can also let hot gas pass into and through the interior of the disc to equalize the temperature on both sides of the skin. The slits on the face towards the nozzle are smaller than on the face exposed to the hot gas. If plugs 26 be omitted the slits will let cooling air escape; in such an arrangement the slits on the face towards the nozzle would be omitted. As the construction of butterfly valve disc 9 is similar except for the curvature of the disc, the Figures 8 and 9 which show disc 9 without the disc 11, serve to illustrate the construction of both discs. Figure 8 shows the section of the hub 27 with bore 27a and of the rim 28 and shows the skin 29 welded to the rim. Figure 9 shows these same parts and two of the channel section ribs 31 welded to the hub 27 and extending parallel to the major axis of the ellipse down to the rim 28, to which they are also welded. These ribs so taper from hub to rim as to guide the skin 29 to give the desired curved external profile. This figure also shows how the skin is folded over the hub where hub and rim meet and is covered by gusset 30.

The disc 11, if it be required, can be of the same form of construction and with the web 12 joining it to the hub 27.

The T-piece 4 is of substantial construction and attached directly to the structure of the aircraft, and shrouded in conventional manner. The connections to the engine jet pipe and to the nozzle 5 may be in conventional form of connections of nozzles to jet pipes—i.e. including flexible bellows or spherical joints which not only transmit no bending load but are also such as to allow for relative longitudinal thermal expansion of the engine.

I claim:
1. A jet-propelled aircraft having a jet nozzle unit with a jet deflector device comprising a pipe junction in the form of a T-piece, a first nozzle projecting rearwardly therefrom, a second nozzle projecting downwardly therefrom along an axis which is a continuation of a straight line passing through the neighborhood of a horizontal line through the center of gravity of the aircraft, a first butterfly valve mounted in said T-piece for movement from a first position in which it is lying along the first said nozzle to a second position in which it is located to block the entrance to the said first nozzle, a second butterfly valve mounted in said T-piece for movement from a first position in which it is located to block the entrance to the said second nozzle to a second position in which it is located to deflect the jet into said second nozzle and downward along said continuation line and wherein the said second butterfly valve in its said second position lies partly along the axis of the downward nozzle, and is curved in a sense to guide the deflected jet smoothly into the downward direction, and a link tying the said butterfly valves to move together from their respective first positions to their respective second positions.

2. A jet propelled aircraft according to claim 1 wherein said second butterfly valve includes a curved guide disc attached thereto in such a position that it lies below the valve and in the said downward nozzle when said second butterfly valve is in its said first position and such that it is located to guide the jet smoothly round into the said downward direction when the said second butterfly valve is in its said second position.

3. A jet-propelled aircraft having a jet nozzle unit with a jet deflector device comprising a pipe junction in the form of a T-piece, a first nozzle projecting rearwardly therefrom, a second nozzle projecting downwardly therefrom, a first butterfly valve mounted in said T-piece for movement from a first position in which it lies along the axis of the first said nozzle to a second position in which it is located to block the entrance to the first said nozzle; a second butterfly valve mounted in said T-piece for movement from a first position in which it is located to block the entrance to the said second nozzle to a second position in which it lies partly along the axis of the downward nozzle, said second butterfly valve being curved in a sense such that in said second position it guides the deflected jet smoothly into the downward direction, and a link tying the said butterfly valves to move together from their respective first positions to their respective second positions.

4. A jet-propelled aircraft according to claim 3 wherein said second butterfly valve includes a curved guide disc attached thereto in such a position that it lies below the valve and in the said downward nozzle when said second butterfly valve is in its said first position and such that it is located to guide the jet smoothly round into the said downward direction when the said second butterfly valve is in its said second position.

References Cited in the file of this patent

UNITED STATES PATENTS

| | | |
|---|---|---|
| 443,326 | Leverich | Dec. 23, 1890 |
| 567,011 | Smith | Sept. 1, 1896 |
| 913,632 | Foster | Feb. 23, 1909 |
| 1,585,281 | Craddock | May 18, 1926 |
| 1,672,266 | Linendoll | Jan. 5, 1928 |
| 1,714,917 | Martin | May 28, 1929 |
| 1,763,350 | Francis | June 10, 1930 |
| 2,601,104 | Douglas | June 17, 1952 |